April 24, 1951  H. V. PHELPS  2,550,291
COTTON SEED PLANTER
Filed Nov. 25, 1946
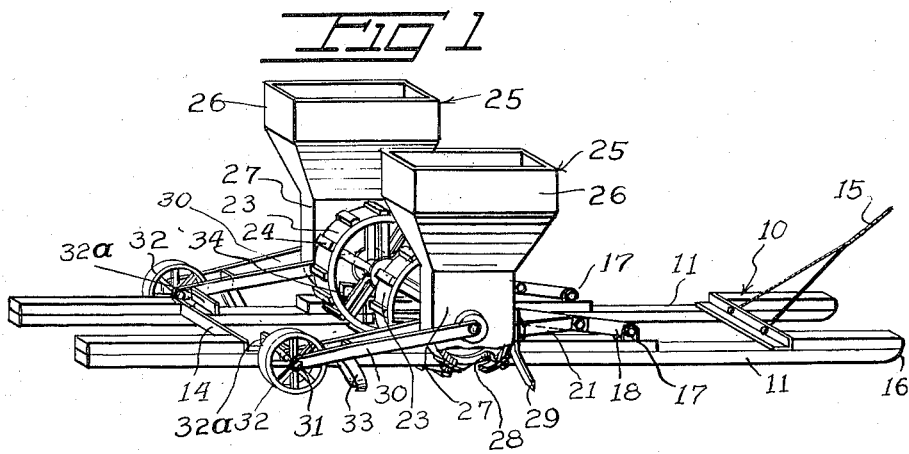
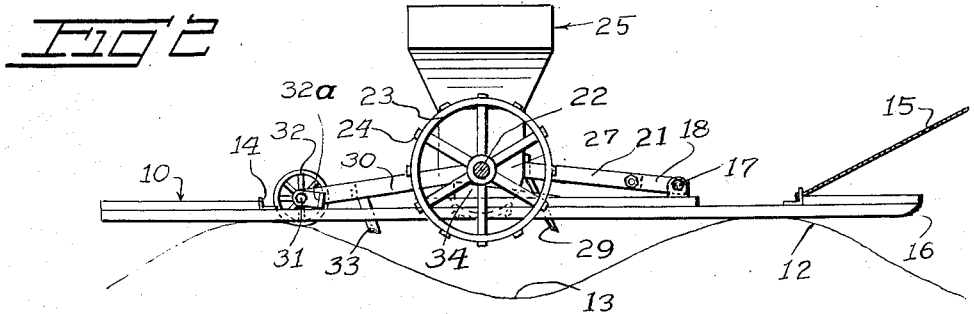
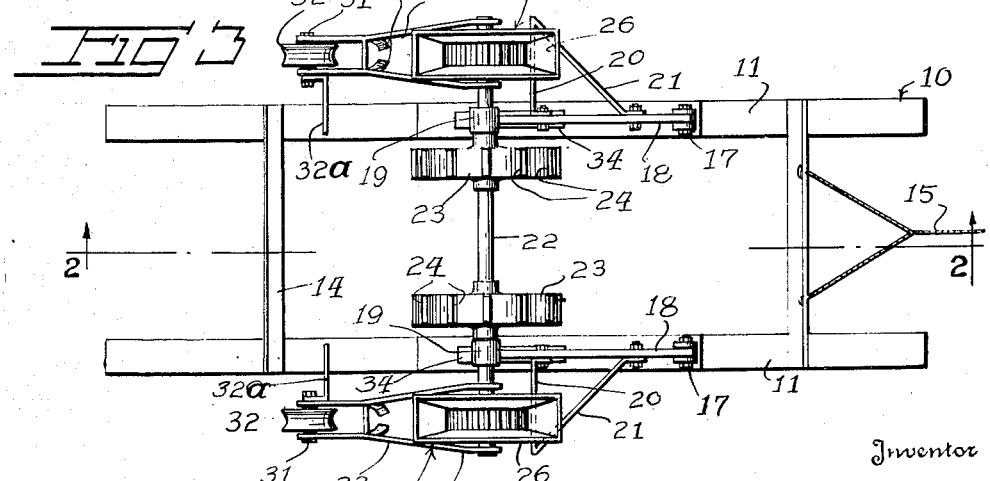
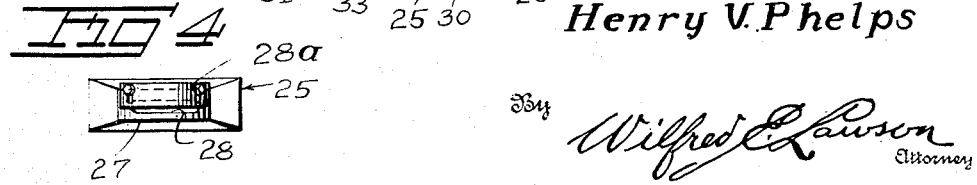
Inventor
Henry V. Phelps
By Wilfred E. Lawson
Attorney

Patented Apr. 24, 1951

2,550,291

UNITED STATES PATENT OFFICE 2,550,291

COTTON SEED PLANTER

Henry V. Phelps, Nitta Yuma, Miss.

Application November 25, 1946, Serial No. 712,100

2 Claims. (Cl. 111—24)

This invention relates generally to cotton farming and is directed particularly to improvements in cotton seed planters.

A principal object of the present invention is to provide an improved check planter which is designed to travel transversely of the plowed furrows and to deposit the cotton seed on the tops of the rows at spaced intervals thereby producing desired rows of cotton plants which are spaced or separated longitudinally of the furrows so as to permit the farmer to cross plow the plant rows to checker the field and isolate the plants in individual hills.

Another object of the invention is to provide a checker planter for cotton seed which is operated by being carried over a field transversely to the furrows and which functions by the engagement of a rotatable element with the top of each earth row crossed to operate a seed depositing mechanism which discharges the seed only upon the top of the row as the planter passes over.

Another object of the invention is to provide a checker planter for cotton seed which is drawn transversely of the plowed furrows and functions by contact of a rotary member with the top of each earth row to deposit the cotton seed on the top of each earth row, wherein the said rotary means is vertically adjustable for effectively controlling the number or quantity of seed deposited on the top of each row as the planter passes over same.

A further object of the invention is to provide a machine for check planting cotton seed which is so designed that it may be conveniently operated by animal or mechanical power and which, also, is so designed that it can be easily and economically constructed and will function accurately and automatically to deposit seed at the proper period thus doing away with the uncertainty and possibility of mistakes which are constantly attendant upon the use of the usual check row planters which depend for their operation upon the use of wires or chains carrying trip burrs.

Other objects and advantages of the invention will become apparent as the description of the same proceeds and the invention will be best understood from a consideration of the following detailed description taken in connection with the accompanying drawing forming a part of the specification with the understanding, however, that the invention is not confined to a strict comformity with the showing of the drawing but may be changed or modified so long as such changes or modifications mark no material departure from the salient features of the invention as expressed in the appended claims.

In the drawing:

Figure 1 is a view in perspective of a seed planter constructed in accordance with the present invention.

Figure 2 is a view of the same in side elevation and across two earth rows.

Figure 3 is a top plan view of the planter.

Figure 4 is a bottom plan detail of a seed feeder showing the control gate.

Referring now more particularly to the drawings the structure of the present invention comprises a carriage of substantial length which is designed to extend across two rows in the plowed field in which the cotton seed is to be planted. This carriage structure is generally designated 10 and comprises the two spaced parallel runners 11 which, for the purpose stated, may be approximately eight feet long.

Furrows and rows are illustrated across which the skid carriage is shown positioned, such rows and furrows being designated respecitvely 12 and 13.

The runners 11 are maintained in the proper spaced relation, in a suitable manner, as for example, by means of the transverse beams 14 and the forward one of such beams is utilized as a draft hitch for the attachment to the skid or sled of a draft cable 15 which may be attached to a tractor or to draft animals.

The forward ends of the runners 11 are suitably turned up or rounded as indicated at 16 to prevent such ends digging into the sides of the earth rows as the sled is drawn transversely thereof in the operation of the machine.

Adjacent to the front end of the sled or in advance of the transverse center thereof, the runners support transversely aligned bearing ears 17. Each of these ears has pivotally attached thereto for swinging in a vertical plane, a pivot arm 18 which terminates at its rear end in a bearing sleeve 19.

The outer side of each arm 18 has rigidly secured thereto the short outwardly extending brace bar 20, the outer end of which is held rigidly in position by the oblique brace bar 21 which extends from the outer end of the bar 20 forwardly to the pivot arm 18 to which it is attached as shown.

Extending transversely of the sled structure and passing through the bearing sleeve 19, is the shaft 22 the ends of which extend outwardly a substantial distance beyond the sides of the sled for the purpose hereinafter described.

Between the runners 11 of the sled the shaft 22 carries a rotary ground engaging means for imparting turning movement to the shaft, such means being here illustrated as comprising the pair of wheels 23 which have tread faces of from two to three inches and which may be provided with cleats 24 to insure proper engagement of the wheel treads with the ground, in the manner hereinafter described, to impart the desired rotary movement to the shaft 22.

If desired use may be made, in place of the pair of wheels 23, of a single relatively broad tread face wheel or a drum which will be secured to the shaft, as the wheels 23 are secured, so as to impart the desired rotation to the shaft.

In view of the fact that a single wide tread wheel or a drum might be used in place of a pair of wheels it will be understood that where reference is made hereafter to "rotary drive means" or 'rotary ground engaging means," any one of these members is meant.

At each outer side of the sled there is located a seed carrying and discharging unit which is generally designated 25. These units are disposed at the outer ends of the shaft 22, to be operated thereby in the manner about to be described.

Each of these units 25 comprises a seed hopper 26 which discharges downwardly into a feed wheel housing 27 through which extends the adjacent end of the shaft 22. These units 25 are maintained in position upon the shaft 22, by the connection with the lower part of the unit, upon the front or forward side, of the adjacent outwardly extending brace arm 20.

The lower part of the feed wheel housing 27 is provided with a seed discharge slot 28 and within each housing there is mounted upon the shaft 22 a seed feeding wheel, not shown, by means of which, when rotated, seed will be caused to move downwardly from the hopper 26 and discharged through the adjacent underlying slot 28 onto the top of the earth row.

Supported upon the front of each feed wheel housing and extending downwardly below the underside thereof in the vertical plane of the feed slot 28, is a furrow opening plow 29. This functions to form a suitable furrow or trough transversely of each row into which the cotton seeds are dropped.

Pivotally connected with and extending rearwardly from the shaft 22 at opposite sides of each feed wheel housing 27, are the rearwardly converging vertically swingable arms 30 between the rear ends of which is supported, upon a suitable transverse shaft 31, a press wheel 32. This wheel follows directly in the track of the plow 29 and cooperating with this wheel and supported from the arms 30 in advance of the press wheel, are the two covering blades 33 which move on opposite sides of the center of the furrow opened by the plow 29 to shift the earth back into the furrow and cover the seeds deposited therein. The following press wheel 32 then packs the earth down firmly over the seeds.

As shown the circular ground engaging elements are of a diameter to extend a desired distance below the rounded lower part of the feed wheel housings 27 so that as the rotary ground engaging units are caused to turn by rolling over an earth row, the discharge opening 28 of the housing will not contact ground and the seed may fall freely into the previously opened furrow which results from the action of the advancing plow 29.

For the regulation of the quantity of seed discharged from the hoppers use may be made of adjustment wedges or blocks 34 which rest upon the runners 11 beneath the bearing sleeves 19 and provide a support for the shaft 22 and the parts connected therewith.

In the use of the present machine, after the ground has been properly prepared, the seeder is drawn over the field along paths perpendicular to the furrows. The said runners 11 rest uopn adjacent earth rows and slide thereover and the rotary ground engaging members 23 hang freely in passing over a furrow but upon approaching a ground row they engage the side of the row and are caused to rotate in their passage across the row. This imparts rotary motion to the shaft 22 and causes the seed feeding wheels, not shown, housed within the housings 27, to turn and feed seed from the hoppers 26 downwardly through the discharge openings 28. As previously explained the advancing plows 29 open furrows transversely of the rows as the machine passes thereover and the seeds are deposited in such furrows. The following covering blades 33 then replace the earth in the furrow and the press wheels 32 pack the earth down over the seeds.

As will be readily apparent the length of seed receiving furrow formed by each plow blade 29 and the quantity of seed deposited is controlled by the height of the shaft 22 and consequently by the distance between the bottom of the rotary ground engaging element and the undersides of the runners 11. If the rotary ground engaging elements are maintained in high position and only extending a short distance below the runners 11 a very short period of rotation will be given the seed feeding wheels whereas if the rotary ground engaging elements are low their period of rotation will be longer and more seed will be discharged.

As will be readily apparent the distance between the hoppers may be set to plant rows in properly spaced relation, the preferred distance between such rows being approximately forty inches. It will also be apparent that whereas there has been shown and described a pair of hoppers upon the shaft 22, the structure may be enlarged as necessary to provide for the simultaneous operation of an increased number of feeding units or hoppers, such as four or six and also the number of rotary ground engaging units between the hoppers may be increased accordingly to produce the best operating results.

With a planter of the character herein disclosed, operated by being drawn transversely of the earth furrows it will be readily seen that the cotton seeds will be deposited at the proper places upon the tops of the rows and the operator does not have the bother of working with the check wires or other devices such as are employed in connection with the present check row planter. Accordingly the chances for making mistakes in depositing the seeds at the proper spaced intervals are eliminated. Also with the present machine the work of chopping out is greatly reduced and the farmer is able by the use of correct plows, to cross plow the field easily between the planted rows to produce a check field and to isolate the plants upon individual hills so that they may be easily cultivated.

In addition to the previously stated means for regulating the discharge of seed use may be made of a slidably adjustable gate 28a as shown in Figure 4. This latter control is of particular value when making use of the planter in the planting of seeds in an unfurrowed field where the seed feed wheels would be constantly in contact with the ground and, therefore, constantly rotating.

The wedges 34 have, also, the function of fixing a limit of movement or "fall" for the rotary drive means, to satisfy the particular field furrow depth condition for proper planting. For example, although two or more fields can be rowed off in similar fashion, after they are harrowed the depths of the furrows in the different fields will ordinarily vary. The wedges or blocks 34 are used to raise or lower the parts carried by the shaft 22 and to thus control the extent of drop or fall of such parts when passing over a furrow and thus meet the varying furrow depth conditions.

Each of the press wheels has associated therewith an inwardly extending arm 32a which overlies the adjacent runner 11. This arm, by engaging the top of the runner prevents the press wheel from dropping down into the furrows.

I claim:

1. In check planting a field having a series of parallel rows and furrows formed in the earth, a seed depositing machine comprising a relatively long sled carriage designed to be drawn transversely of the rows and having a length to extend at all times across and rest upon at least two rows, vertically swingable members supported upon the carriage for swinging movement on an axis extending transversely of the carriage, a horizontal transversely extending shaft rotatably supported by said vertically swingable members, a rotary ground engaging element secured to the shaft to extend to a predetermined position below the carriage for contact with the tops of the rows over which the carriage is drawn, adjustable means between the carriage and said vertically swingable members for adjustably maintaining said rotary element free of contact with the earth in passing over the said furrows, seed hoppers supported by the carriage at opposite ends of the shaft, and seed feeding means connected with and rotated by the shaft to discharge seeds downwardly from the hopper onto the ground.

2. A seed depositor of the character stated for movement across plowed furrows to deposit seeds upon the tops of earth rows between the furrows, comprising a sled structure having two relatively long spaced parallel runners, a pair of arms each pivotally supported upon a runner for vertical oscillation upon a common axis extending transversely of the sled, a shaft rotatably supported by said arms adjacent their free ends for vertical movement, a ground engaging wheel supported on the shaft between the runners and adapted to be lowered to a position in which its periphery extends below the runners, rotary seed feeding units supported at the outer sides of the sled upon the ends of the shaft to be operated by and upon rotation of the shaft for the discharge of the seed downwardly onto the ground, means carried in trailing relation with the seed depositing units for covering deposited seeds, means for adjusting the vertical position of the shaft to limit the downward movement of the ground engaging wheel beyond the bottom of the sled.

HENRY V. PHELPS.

REFERENCES CITED

The following references are of record in the file of this patent:

UNITED STATES PATENTS

| Number | Name | Date |
|---|---|---|
| 86,595 | Sabins | Feb. 2, 1869 |
| 622,996 | Detheridge | Apr. 11, 1899 |
| 848,154 | Brown | Mar. 26, 1907 |
| 1,696,562 | Allen | Dec. 25, 1928 |
| 2,441,072 | Johnson | May 4, 1948 |